US010685331B2

(12) United States Patent
Song et al.

(10) Patent No.: US 10,685,331 B2
(45) Date of Patent: Jun. 16, 2020

(54) PERSONALIZED FUNC SEQUENCE SCHEDULING METHOD AND SYSTEM

(71) Applicant: TCL RESEARCH AMERICA INC., San Jose, CA (US)

(72) Inventors: Bo Song, San Jose, CA (US); Lifan Guo, San Jose, CA (US); Haohong Wang, San Jose, CA (US)

(73) Assignee: TCL RESEARCH AMERICA INC., San Jose, CA (US)

( * ) Notice: Subject to any disclaimer, the term of this patent is extended or adjusted under 35 U.S.C. 154(b) by 1225 days.

(21) Appl. No.: 14/962,735

(22) Filed: Dec. 8, 2015

(65) Prior Publication Data

US 2017/0161689 A1 Jun. 8, 2017

(51) Int. Cl.
*G06Q 10/10* (2012.01)
*G06F 16/9032* (2019.01)
*H04L 29/08* (2006.01)

(52) U.S. Cl.
CPC ... *G06Q 10/1095* (2013.01); *G06F 16/90324* (2019.01); *H04L 67/22* (2013.01); *H04L 67/306* (2013.01)

(58) Field of Classification Search
CPC .......... G06Q 10/1095; G06F 16/90324; H04L 67/22; H04L 67/306
USPC ................................. 705/7.25, 7.26
See application file for complete search history.

(56) References Cited

U.S. PATENT DOCUMENTS

| | | | | |
|---|---|---|---|---|
| 2005/0132014 A1* | 6/2005 | Horvitz | .................. | G06Q 30/02 709/206 |
| 2007/0050191 A1* | 3/2007 | Weider | .................... | G10L 15/22 704/275 |
| 2007/0067373 A1* | 3/2007 | Higgins | .............. | G06F 11/3013 |
| 2010/0229120 A1* | 9/2010 | Inoue | .................... | G06F 3/0482 715/811 |
| 2011/0106736 A1* | 5/2011 | Aharonson | .......... | G06Q 10/109 706/12 |
| 2013/0024778 A1* | 1/2013 | Reeves | ................. | G06F 3/1423 715/744 |

(Continued)

OTHER PUBLICATIONS

Understanding and Prediction of Mobile Application Usage for Smart Phones, Shin et al., UbiComp '12: Proceedings of the 2012 ACM Conference on Ubiquitous Computing Sep. 2012, pp. 173-182 (Year: 2012).*

*Primary Examiner* — Timothy Padot
*Assistant Examiner* — Darlene Garcia-Guerra
(74) *Attorney, Agent, or Firm* — Anova Law Group, PLLC (57) ABSTRACT

A method is provided for recommending a desired func sequence schedule to a user. The method includes obtaining at least one user intention inputted by the user; creating a func sequence including a plurality of funcs for fulfilling the user intention; and determining user preference on scheduling of the plurality of funcs in the func sequence. The method also includes determining a dependency relationship among the plurality of funcs in the func sequence; and determining scheduling constraints to the scheduling of the plurality of funcs in the func sequence. The method further includes, based on the user preference, the dependency relationship, and the scheduling constraints, performing an optimization process to determine a desired schedule for the plurality of funcs in the func sequence to fulfill the user intention; and recommending the func sequence with the desired schedule to the user.

12 Claims, 3 Drawing Sheets

(56) References Cited

U.S. PATENT DOCUMENTS

| | | | |
|---|---|---|---|
| 2013/0111487 A1* | 5/2013 | Cheyer | G10L 15/22 718/102 |
| 2015/0058345 A1* | 2/2015 | Mishra | G06Q 50/01 707/737 |
| 2015/0178378 A1* | 6/2015 | Hellstrom | G06Q 10/10 706/14 |
| 2017/0024389 A1* | 1/2017 | Liu | G06F 16/951 |
| 2017/0140285 A1* | 5/2017 | Dotan-Cohen | G06N 5/048 |
| 2018/0032997 A1* | 2/2018 | Gordon | G06Q 20/3224 |

* cited by examiner

FIG. 4

PERSONALIZED FUNC SEQUENCE SCHEDULING METHOD AND SYSTEM

FIELD OF THE INVENTION

The present invention generally relates to the field of information technology and user interface technologies and, more particularly, to methods and systems for personalized FUNC sequence scheduling methods and systems.

BACKGROUND

Nowadays mobile apps (short for applications) grow into a tremendous market and, correspondingly, people's life styles are greatly changed as people increasingly rely on apps to accomplish their daily needs. Mobile users installed large number of apps on their smart phones and interact with apps intimately every day. Recent research made much effort on better ways to improve users' experience of using apps, but such research mostly focuses on the level of apps. However, in reality, user behaviors show only one or few content pages or functionalities in an app is often utilized. On the other hand, a user's need is usually fulfilled by a series of actions which are implemented one after another, which can be described as a sequence of functions with consecutive orders that fulfills the user's need.

For example, when a user needs to take a photo, the user might not need to use other functions like chatting in the WeChat app. Instead, providing a user with the exact "take photo" function page in WeChat is a better user experience then offering the user the whole app. When a user need is "I want to eat at Red Lobster", an ideal solution would be a function sequence: using the OpenTable function to make a seat reservation, using the Uber request page made to that specific place, and then using the Yelp review page to leave comments.

However, current techniques often do not focus on the function level of app usage. Thus, even if the user wants to find multiple functions to meet a need. It may be difficult for the user to find a potential function sequence, and it may be more difficult for the user to use it without spending a considerable amount of time to figure out how to use the potential function sequence.

The disclosed methods and systems are directed to solve one or more problems set forth above and other problems.

BRIEF SUMMARY OF THE DISCLOSURE

One aspect of the present disclosure includes a method for recommending a desired func sequence schedule to a user. The method includes obtaining at least one user intention inputted by the user; creating a func sequence including a plurality of funcs for fulfilling the user intention; and determining user preference on scheduling of the plurality of funcs in the func sequence. The method also includes determining a dependency relationship among the plurality of funcs in the func sequence; and determining scheduling constraints to the scheduling of the plurality of funcs in the func sequence. The method further includes, based on the user preference, the dependency relationship, and the scheduling constraints, performing an optimization process to determine a desired schedule for the plurality of funcs in the func sequence to fulfill the user intention; and recommending the func sequence with the desired schedule to the user.

Another aspect of the present disclosure includes a system for recommending a desired func sequence schedule to a user. The system includes an input module, a func sequence module, a func preference learning module, a func sequence scheduling module, and an optimal schedule output module. The input module is configured to obtain at least one user intention inputted by the user. The func sequence module is configured to create a func sequence including a plurality of funcs for fulfilling the user intention. The func preference learning module is configured to determine user preference on scheduling of the plurality of funcs in the func sequence. The func sequence scheduling module is configured to determine a dependency relationship among the plurality of funcs in the func sequence, to determine scheduling constraints to the scheduling of the plurality of funcs in the func sequence and to, based on the user preference, the dependency relationship, and the scheduling constraints, perform an optimization process to determine a desired schedule for the plurality of funcs in the func sequence to fulfill the user intention. Further, the optimal schedule output module is configured to recommend the func sequence with the desired schedule to the user.

Other aspects of the present disclosure can be understood by those skilled in the art in light of the description, the claims, and the drawings of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts.

As used herein, the term "FUNC" or "func" may be used to represent an access point of an app, i.e., a function of the app. Each func may be a function-level operation flow, which is associated with a function or service that satisfies a user's specific need. For a same need, different users may use different funcs in different mobile apps according to the user's habits or preferences (for example, a user may use Facebook to share a picture, and another user may use WeChat for the same purpose). Because the func provides an entrance to a native app, a web app, or a customized function, the func may be used to make transition from one mobile app to the other mobile app to achieve a function sequence.

Based on the func concept, a functional flow of user's action can be built up more smoothly without using the app-level operations. The app-level operations refer to certain operations that are performed among multiple mobile apps or web services by frequently using the home page, and thus more user interactions (screen touches or key presses) may be required and it may be more difficult to implement a function sequence.

According to the present disclosure, one approach to resolve the difficulty creating and using a function sequence from different apps is to provide a personalized func sequence scheduling process and system, which may recommend a best or desired func sequence and scheduling for a user by utilizing the user's personal preference data together with other users' records.

Figure 1:
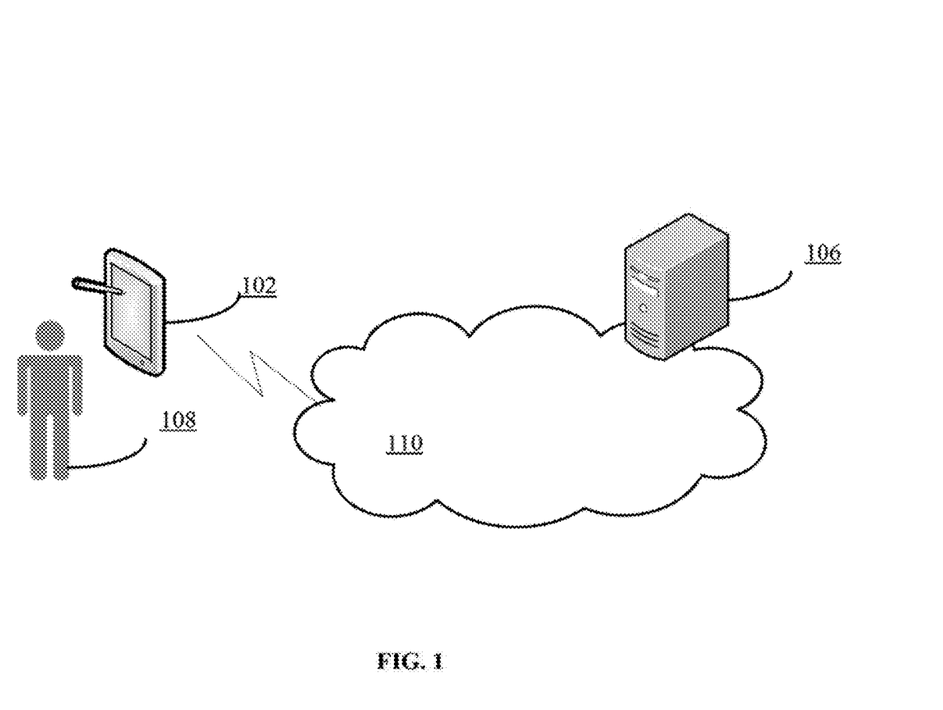
FIG. 1 illustrates an exemplary environment incorporating certain embodiments of the present invention.

FIG. 1 illustrates an exemplary environment 100 incorporating certain embodiments of the present invention. As shown in FIG. 1, environment 100 may include a terminal 102, a server 106, a user 108, and a network 110.

Terminal 102 (also known as a terminal device) may refer to any appropriate user terminal with certain computing capabilities, such as a personal computer (PC), a work station computer, a server computer, a hand-held computing device (tablet), a smartphone or mobile phone, or any other user-side computing device. In certain embodiments, terminal 102 may be a mobile terminal device, such as a smartphone, a tablet computer, or a mobile phone, etc. Terminal 102 may be implemented on any appropriate computing platform. Terminal 102 may be used by user 108 to connect to network 110 and make requests to server 106. The terminal 102 may obtain webpages from any appropriate sources, such as from a local storage device, from a wired or wireless network device of a service provider, or from the Internet.

Further, the server 106 may refer to one or more server computers configured to provide certain web server functionalities (e.g., search server). The server 106 may include one or more processors to execute computer programs in parallel. The server 106 may store webpages to be access by terminals, and each of these webpages has a unique web address. The unique web address is also called Uniform Resource Locator (URL). The server 106 may also provide various apps to the terminal 102 as requested by the user 108 and/or may make various recommendations to the user about the web pages and/or apps and app functions. The server 106 may also be a cloud server.

Terminal 102 and server 106 may communicate with each other through communication network 110, such as a cable network, a phone network, and/or a satellite network, etc. Although one terminal 102 and one server 106 are shown in FIG. 1, any number of terminals and/or network devices may be included.

Figure 2:
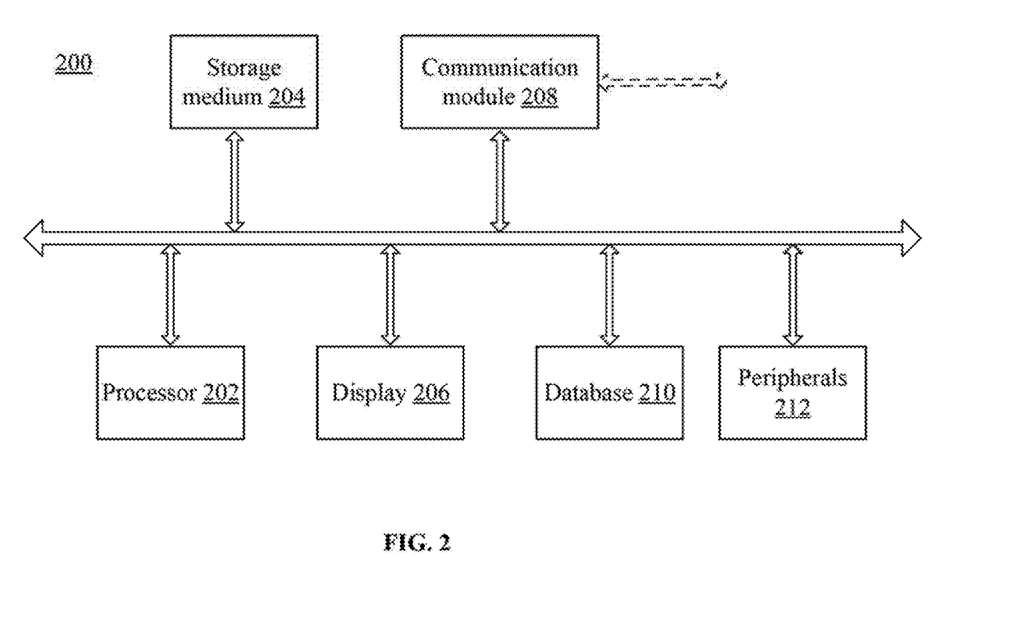
FIG. 2 illustrates an exemplary computing system consistent with the disclosed embodiments.

Terminal 102, and/or server 106 may be implemented on any appropriate computing circuitry platform. FIG. 2 shows a block diagram of an exemplary computing system 200 capable of implementing terminal 102, and/or server 106.

As shown in FIG. 2, computing system 200 may include a processor 202, a storage medium 204, a display 206, a communication module 208, a database 210, and peripherals 212. Certain devices may be omitted and other devices may be included.

Processor 202 may include any appropriate hardware processor or processors. Further, processor 202 can include multiple cores for multi-thread or parallel processing. Storage medium 204 may include memory modules, such as ROM, RAM, flash memory modules, and mass storages, such as CD-ROM and hard disk, etc. Storage medium 204 may store computer programs for implementing various processes, when the computer programs are executed by processor 202.

Further, peripherals 212 may include various sensors and other I/O devices, such as keyboard and mouse, and communication module 208 may include certain network interface devices for establishing connections through communication networks. Database 210 may include one or more databases for storing certain data and for performing certain operations on the stored data, such as database searching.

In operation, user 108 may, through terminal 102 or a web browser on terminal 102, intend to use certain applications (apps) or mobile apps available on the terminal 102 or online from various servers 106. A mobile app may have a home page or other direct access point that may be used to achieve a certain function. The mobile app access point may include an entrance to the function on the mobile device or web, a type of the function, and other relevant information, such as location, status, and nature of the function, etc. The function may include a native mobile app, a web app, and a customized function as a cloud application programming interface (API).

A native mobile app may refer to a mobile device application that is coded in a specific programming language for a particular operating system. The native mobile app is installed directly on a mobile device. A web app may refer to a website that is tailored to function via a web browser on a mobile device. The entrance to function and the type of the entrance may include a variety of configurations. For example, an access point may include a link to a web app page, a link to a customized function, a link or shortcut to an installed native app page, a link to a page of a compressed version of a native app, a link to the action of native app download and installation, and a link to an app guideline page that suggests the user to open an alternative app, etc.

Figure 3:
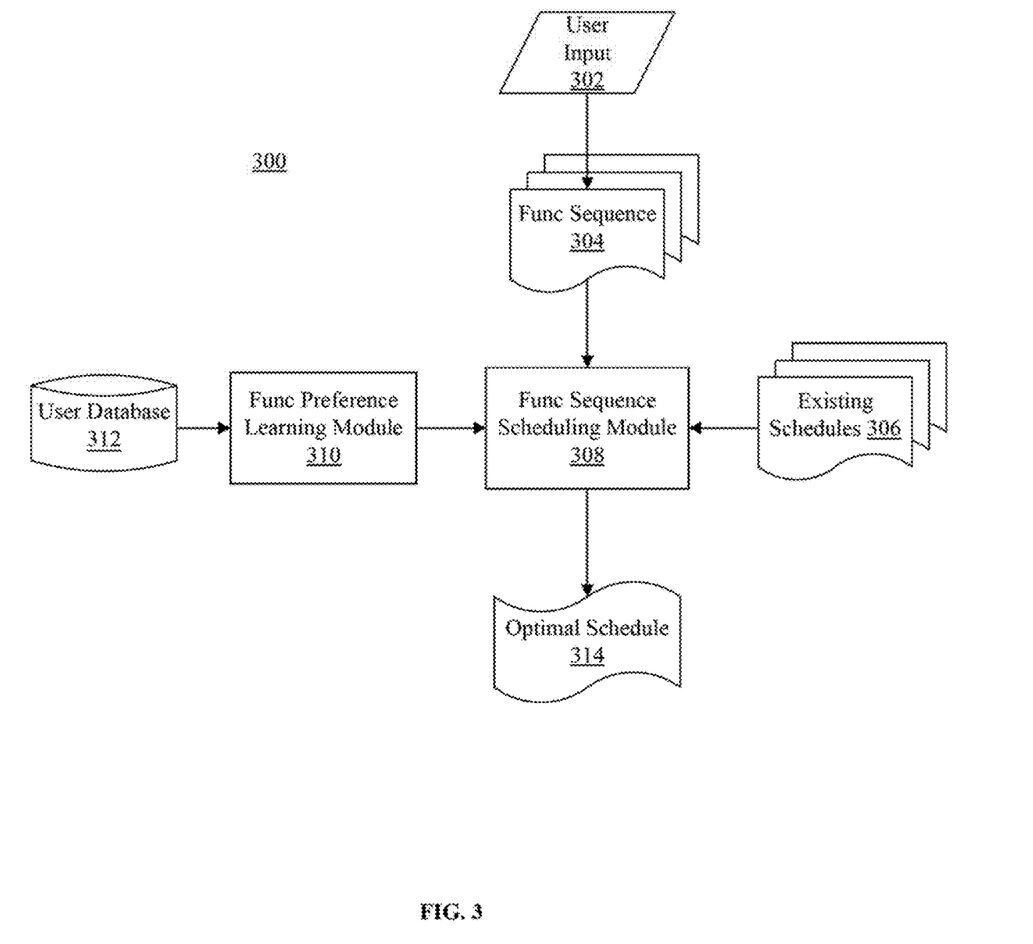
FIG. 3 illustrates a structure schematic diagram of an exemplary func sequence scheduling and recommendation system consistent with the disclosed embodiments.

Further, server 106 may provide a func sequence scheduling and recommendation system to form appropriate func sequence scheduling taking into account the user's preferences, func dependency relationships in a func sequence, constraints of precedence, and conflict among different funcs and to automatically recommend a user-preferred, conflict-free and overall optimized schedule of a func sequence for fulfilling user's need. FIG. 3 illustrates an exemplary func sequence scheduling and recommendation system 300.

As shown in FIG. 3, the func sequence scheduling and recommendation system 300 may include an input module 302, a func sequence module 304, an existing schedule module 306, a func sequence scheduling module 308, a func preference learning module 310, a user database 312, and an optimal schedule output module 314. Certain module(s) may be omitted and other modules may also be included.

The user input module 302 may be provided to obtain a user request for apps to fulfill certain user needs or to provide functions, or to receive a user inquiry for apps to provide the certain needs or functions. The user request or inquiry may be in any appropriate format, such as text format, voice format, image format, etc.

The func sequence module 304 may receive the user's need in the user request or inquiry from the user input module 302 and may map the user's need to a func sequence for fulfilling the user's need.

The user's need may be fulfilled by implementing several funcs, from a single app or from multiple apps, one after another in a sequence. Different user needs may require different numbers of funcs and/or different func sequences. Provided that F is defined as a func sequence fulfilling a user's need, which includes n numbers of funcs in the sequential order:

$$F=\{f_1, f_2, \ldots, f_n\}, n \in \mathbb{N} \qquad (1),$$

where, each fun $f_i$ ($1 \leq i \leq n$) in the F is to be implemented after its previous func $f_{i-1}$ been accomplished, and a different number n and/or different funcs form a different F. N may be a predetermined maximum number of funcs to be included in a func sequence.

The different funcs may need to be scheduled. Scheduling a func sequence F is to arrange the implementing time for each $f_i$ in the F. A schedule of each func $f_i$ can be defined as:

$$S(f_i)=(f_i,t_j), j \in \mathbb{N} \quad (2)$$

Where $t_j$ is one of the possible times that can be scheduled to implement or perform the $f_i$. S(F) is then the scheduling for all funcs in a func sequence F.

Thus, the func sequence module 304 may output a func sequence F that contains n funcs in consecutive order to be implemented to fulfill the user's need. The mapping from a user's need to a func sequence may be performed based on a predetermined algorithm.

Further, the existing schedule module 306 may contain or obtain funcs that are already scheduled for the user. The scheduled funcs may be included in a scheduling constraint C to be considered while form a user-desired func sequence, i.e., the scheduling constraint C may require no conflict between $S(f_i)$ and the existing schedules.

The user database 312 may collect and stores all users' func related information, including the requesting user's data. The func related information may contain any information related to users' func usage, such as the user's as well as all other users' history of implementing func $f_i$ on certain times under certain contextual conditions.

Further, the func preference learning module 310 may learn user's personal preferences on func $f_i$ at different times, based on collected user's history records in the user database 312. For example, the func preference learning module 310 may apply a collaborative filtering (CF) model to learn from the user database 312 and predict user preferences $q(S(f_i))$ on every possible schedule.

The func sequence scheduling module 308 may determine an optimal scheduling $T_o$ by utilizing the user's preference $q(S(f_i))$ from the func preference learning module 310 together with func dependency relationships $p(S(f_{i-1}),S(f_i))$ of the func sequence F in a vertex-n-edge-weighted directed acyclic digraph (DAG) network G=(V,E) while satisfying the scheduling constraints C. After the func sequence scheduling module 308 determines the optimal scheduling, the func sequence scheduling module 308 may output the determination results to the optimal schedule output module 314.

The optimal schedule output module 314 may present the user with an optimal, personalized, and conflict-free schedule of a func sequence F that fulfills the user's need. The user may make any changes and/or have any new constraint and to cause the func sequence scheduling and recommendation system 300 to determine or recommend such changes and/or new constraints. The user may confirm the presented schedule, and the optimal schedule output module 314 may save the confirmed schedule and update the user database 312 with the confirmed schedule for further learning of the user's preferences.

Figure 4:
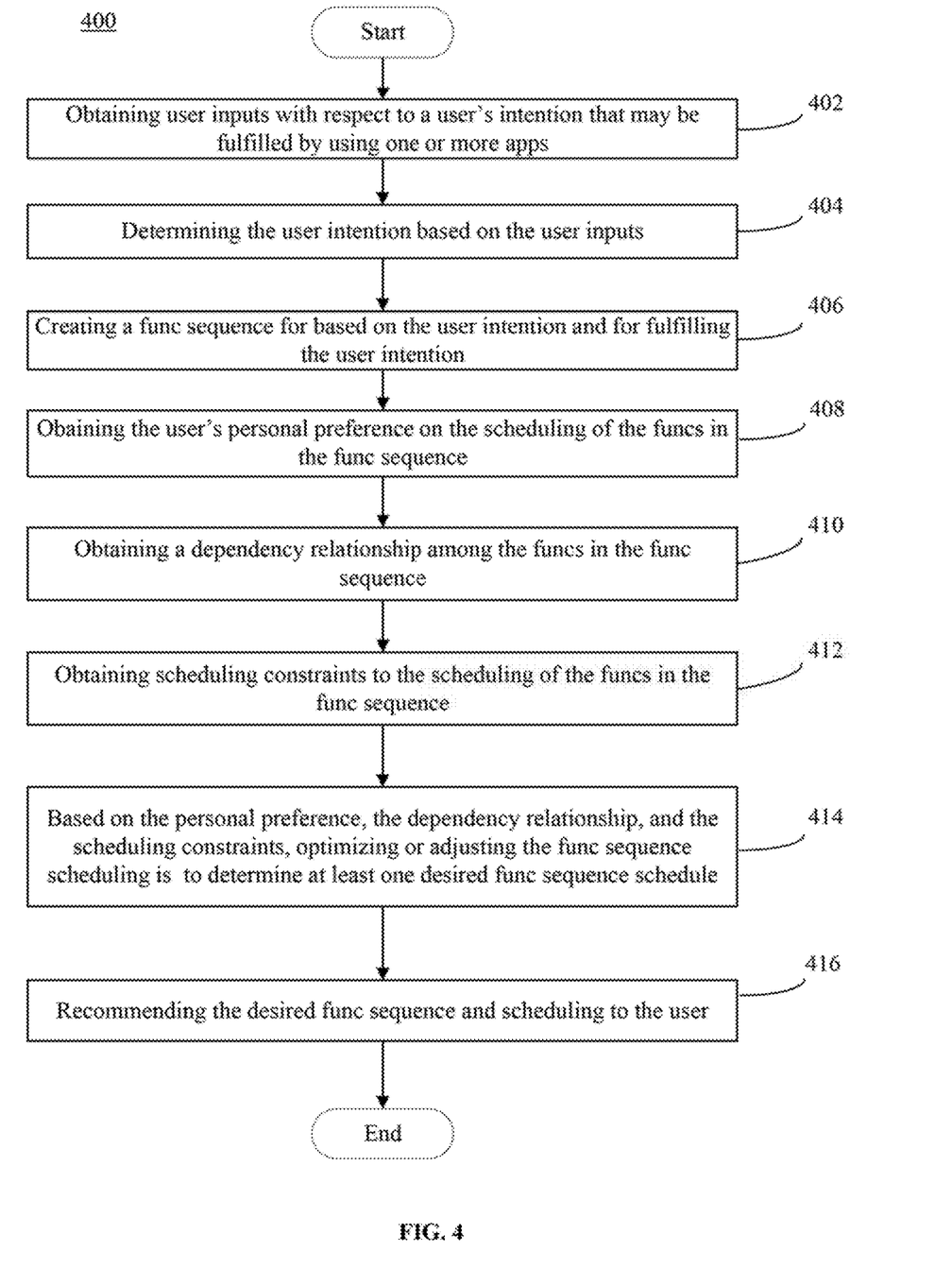
FIG. 4 illustrates an exemplary func sequence scheduling and recommendation process consistent with the disclosed embodiments.

More specifically, through the various modules, the func sequence scheduling and recommendation system 300 may perform a func sequence scheduling and recommendation process consistent with the disclosed embodiments. FIG. 4 illustrates an exemplary func sequence scheduling and recommendation process.

As shown in FIG. 4, at the beginning of the process, user inputs may be obtained with respect to user's intention that can be fulfilled by using a func sequence of one or more apps (402). Based on the user inputs, the user intention may be determined (404). For example, the user intention may include an intention list having one or more intentions, or other types of intention or needs from the user.

Further, at least one func sequence may be created based on the user intention and for fulfilling the user intention (406). The at least one func sequence may be created using a predetermined algorithm. For example, the user intention may first be separated into a plurality of tasks, which is a basic unit in fulfilling a user intention. When the intention list includes more than one intentions, each intention may be processed independently and the processing results for each intention may be combined at the end of the processing. For example, a sequence of intentions deduced from user text request may be inputted to the func sequence module 304.

The tasks for an intention may be predefined or may be defined in real-time. Also, the predefined tasks may be a fixed number of tasks or may be variable number of tasks to be combined for a particular intention. In other words, for each intention, the tasks to fulfill each intention have been pre-defined. For example, the "cooking at home" is an intention. To fulfill this intention, the tasks may include: "find a supermarket", "go to the supermarket", "buy the material", "pay", "go home", "find recipe", "prepare food" and "cooking".

Although the plurality of tasks are pre-defined, no particular order or sequence may be defined regarding the plurality of tasks. Thus, there may be multiple task sequences to fulfill each intention. That is, the plurality of tasks may implement multiple task sequences.

Each task can be implemented by different funcs, while each func can fulfill one task or a set of tasks. For example, "taking photo" is a task, and can be implemented by "taking photo" function page either in "WeChat" or in "Poco Food Camera". Also for example, while "Panda Express" page in Yelp is a func, fulfilling both tasks of "dish review" and "find the address". Therefore, each intention is fulfilled by a set of tasks, while each task can be implemented by various funcs.

Thus, by deriving task sequences based on the user intention, the func sequences can also be derived based on the user intention. For example, the user log may include temporal sequences of tasks and funcs that users choose to fulfill the tasks. Further, such deriving process may also be a continuous or active learning process. The more frequently the funcs and tasks are visited by the user, the more popular and important the funcs and tasks may become. The task and func importance learning is an active learning process.

Thus, a func sequence $F=\{f_1, f_2, \ldots, f_n\}$ can be created based on the user inputs to fulfill the user's needs, and the implementing time for each $f_i$ in the F is also defined as a schedule $S(f_i)=(f_i,t_j)$ of each func $f_i$ after the func sequence is created.

Further, if defining T(■) as a function of time, then $T(S(f_i))=t_j$, and T(S(F)) is the time results of a scheduling of a func sequence F. T(S(F)) can be simply denoted by T which represents a time series in temporal order as a scheduling result of an F, where the ith time in the T corresponds to the $f_i$ in F as its implementing time. Different schedule of time $t_j$ in a schedule $S(f_i)$ may generate a different scheduling result T.

Further, the user's personal preference is obtained and considered with the scheduling of the funcs in the func sequence (408). That is, a personalization process may be performed, such that the user can appreciate that the automatic scheduling is the same or substantially similar to the user's own manual scheduling. The user's personal preference on a schedule of a func $f_i$ is defined by a function $q(S(f_i))$.

To obtain $q(S(f_i))$, the user's preference of a schedule $S(f_i)$ for a single func $f_i$ to be implemented on any time is determined. For example, the user's preference may be obtained from history records in the user database 312 if the user database 312 has specific information on the user related to the funcs in the func sequence. However, a user's real history records from the user database 312 may only provide sparse information like user's func implementation frequency on some experienced times that partially reflects user's preferences.

In order to obtain the absent user's preferences of a schedule $S(f_i)$ on any time, a Collaborative filtering (CF) model may be used, in which the user's implementation frequency of a func $f_i$ on any time can be learned from the sparse user history data and predicted for the absent data, by leveraging a user's individual history data with those from other users. CF model is also able to handle rich contextual conditions (e.g. time, location, temperature, etc.), where user's implicit preferences under complex conditions can be inferred and predicted from the user's explicit historical pattern together with those from other users.

The problem of predicting absent information can be turned into a sparse N-dimensional tensor (e.g., a 3-dimensional tensor when considering func, time, user), and tensor factorization is applied to solve this problem instead of two-dimensional matrix factorization for a traditional recommender system. Because generalizing to $4^{th}$ or larger dimension (e.g. including consideration of location) can be easily achieved based on the 3-dimensional tensor, for simplistic purposes, the CF model used herein is described in 3-dimensional tensor: func, time, user.

Thus, the resulting tensor is defined as $Y \in \mathbb{N}^{n \times r \times w}$, where n is the number of funcs, r is the number of times and w is the number of users, which contains the frequency of interaction between the func, time and the user, i.e., the frequency of a user $u_k$ implementing an func $f_i$ at a time $t_j$ ($k \in [1, w]$, $i \in [1, n]$, $j \in [1, r]$).

Solving the above problem of predicting absent information is to decompose this tensor into three matrices $F \in \mathbb{R}^{n \times d}$, $T \in \mathbb{R}^{r \times d}$ and $U \in \mathbb{R}^{w \times d}$, where d is the dimension of central tensor, using the Cannonical Decomposition or Parallel Factors (CP-decomposition) model which corresponds to learned factors that form a profile for each func, time and user variable respectively.

Let denote $F_{i*}$ or represent the entries of the ith row of matrix F. Similarly, $T_{j*}$ represents the entries of the jth row of matrix T, and $U_{k*}$ represents the entries of the kth row of matrix U. The decision function that would predict the absent frequency of interaction as a score for a user $u_k$ to implement func $f_i$ at time $t_j$ can be given by the following equation.

$$S_{ijk} = \langle F_{i*}, T_{j*}, U_{k*} \rangle = \Sigma_{g=1}^{d} F_{ig} T_{jg} U_{kg} \quad (3)$$

For a user $u_k$, the user's absent preference of a schedule $S(f_i)$ on a time $t_j$ can then be reflected by the predicted sore $S_{ijk}$.

The aim of this model is to compute the factors for the func $F^{r \times d}$, time $T^{l \times d}$ and user $U^{n \times d}$, combining together historical explicit data. These factors may be computed by minimizing the following objective function:

$$\min_{F,T,U} \sum_{i}^{r} \sum_{j}^{t} \sum_{k}^{n} \left[ (p_{ijk} - S_{ijk})^2 + \frac{\lambda}{r}\|F_{i*}\|^2 + \frac{\lambda}{l}\|T_{j*}\|^2 + \frac{\lambda}{n}\|U_{k*}\|^2 \right] \quad (4)$$

Where: $p_{ijk}$ is the observed explicit func-time-user frequency history records from the user database 312;

$$\left( \frac{\lambda}{r}\|F_{i*}\|^2 + \frac{\lambda}{l}\|T_{j*}\|^2 + \frac{\lambda}{n}\|U_{k*}\|^2 \right)$$

is the regularization term based on the $L_2$ norm of these factors.

Referring to FIG. 4, after the user's preference is obtained, a dependency relationship among the funcs in the func sequence may be determined or obtained (410). A func in a func sequence should has dependency relationship with neighboring funcs instead of taking independent effect, as they are implemented consecutively and which as a whole fulfills a user need. For example, the dependency of a schedule considering its previous one may be defined by a function $p(S(f_{i-1}),S(f_i))$. Such consideration can also be easily extended two or more previous schedules.

That is, func dependencies in a func sequence are also considered during the func scheduling. Users usually implement funcs in a func sequence consecutively at different corresponding times in temporal order, and naturally there are dependency relationships among the funcs. Such dependency of funcs may be considered and factored in by modeling with adapting the Hidden Markov Models (HMMs) from tagging problem (or named sequence labeling problem) to obtain joint conditional probability that represents the user's preferences of carrying out an entire func sequence.

Using unigram HMMs as example, the func dependency can be determined by calculating its conditional probability $p(S(f_{i-1}),S(f_i))=P(S(f_i)|S(f_{i-1}))$, which means the probability of a schedule $S(f_i)$ is related to and depended on its one previous schedule $S(f_{i-1})$. It can also extend the func dependency consideration to previous two or more funcs in a F which can be calculated as $p(S(f_{i-2}), S(f_{i-1}), S(f_i))=P(S(f_i) |S(f_{i-1}), S(f_{i-2}))$ or $p(S(f_{i-n}), \ldots, S(f_{i-1}), S(f_i))=P(S(f_i)|S(f_{i-1}), \ldots, S(f_{i-n}))$.

Such conditional probability can be obtained from the frequency value recorded in the user database 312. For example, when considering dependency on previous one schedule, the conditional probability $P(S(f_i) S(f_{i-1}))$ can be obtained by $$P(S(f_i) | S(f_{i-1})) = \frac{c(S(f_i), S(f_{i-1}))}{c(S(f_{i-1}))},$$

where c is the observation counts of a schedule experienced by the user.

Further, by normalizing predicted scores obtained from personal preference learning module 310 for a func $f_i$ at any time $t_j$ for a user $u_k$, the $q(S(f_i))$ can be obtained, which can be interpreted as the probability of the user $u_k$ implementation frequency given a schedule $S(f_i)$ of a single func $f_i$ on time $t_j$, reflecting the user's preference of a single schedule.

With the probability of $p(S(f_{i-1}),S(f_i))$ and $q(S(f_i))$, it is able to refer to the tagging problems and represent the user's preferences of carrying out an entire func sequence F on the corresponding possible scheduling result time series T as a joint probability P, which is described in the following equation:

$$P(F,T) = \Pi_{i=1}^{n} q(S(f_i)) \cdot p(S(f_{i-1}),S(f_i)) \quad (5)$$

Further, referring to FIG. 4, scheduling constraints may be obtained to be considered with the scheduling of the funcs in the func sequence (412). That is, the schedule should be subject to scheduling constraints of precedency and conflict-free.

If defining the duration of a func $f_i$ (time needed to finish a fun) as a function $d(f_i)$, and the transportation time to reach to the location that a func $f_i$ takes place from that of its previous func $f_{i-1}$ as a function $l(f_{i-1}, f_i)$, the scheduling constraints C can be defined as:

$$T(S(f_i)) - T(S(f_{i-i})) \geq d(f_{i-1}) + l(f_{i-1}, f_i) \quad (6)$$

Further, based on the personal preference, the dependency relationship, and the scheduling constraints, the func sequence scheduling is optimized or adjusted to determine at least one desired func sequence schedule (414). That is, the optimization or adjustment is to find the personalized func sequence scheduling among all possible scheduling as the optimal T, denoted as $T_o$, to implement a func sequence F that fulfills a user's need satisfying the requirements of the personal preference, the dependency relationship, and the scheduling constraints.

That is, based on these factors, the personalized func sequence scheduling may be formulated as an optimization problem to find the optimal $T_o$ that maximizes the user's personal preferences of implementing a sequence of funcs F with dependency relationships while subjecting to scheduling constraints, as illustrated the following equation:

$$T_o = \underset{T}{\mathrm{argmax}} \left\{ \prod_{i=1}^{n} q(S(f_i)) \cdot p(S(f_{i-1}), S(f_i)) \cdot e_i \right\} \quad (7)$$

$$\text{s.t.} \begin{cases} e_i = 1, & \text{if } C \text{ is satisfied} \\ e_i = \frac{1}{\infty}, & \text{else} \end{cases}$$

where $q(S(f_i))$ represents the user's personal preference on a schedule of a func $f_i$ which can be learned and predicted by adapting collaborative filtering (CF) model and leveraging the user's individual func using history records together with those of other users. $p(S(f_{i-1}), S(f_i))$ reflecting func dependency relationship can be obtained by calculating the conditional probability of a schedule $S(f_i)$ given its previous schedule $S(f_{i-1})$ by applying adapted Hidden Markov Models (HMMs) from researches of tagging problems. Extending the consideration dependency on previous two or more funcs as $p(S(f_{i-2}), S(f_{i-1}), S(f_i))$ or $p(S(f_{i-n}), \ldots, S(f_{i-1}), S(f_i))$ can be easily achieved. $e_i$ indicates whether a schedule $S(f_i)$ satisfies scheduling constraints C, which can be guaranteed when there finds the optimal scheduling result $T_o$ as the optimal path in a vertex-n-edge-weighted directed acyclic digraph (DAG) network G=(V,E) built by adapting critical path analysis model from graph theoretic problem.

Specifically, a vertex-n-edge-weighted directed acyclic digraph (DAG) network may be built to find the optimal path in the graph that represents the best or desired scheduling of the F resulting in the optimal $T_o$ while satisfying all scheduling constraints C.

By referring to the critical path analysis method from the graph theoretic model, the DAG model may be built with the following notations:

1) G=(V,E) is a directed acyclic digraph (DAG).
2) a vertex in the set of vertices V defines a schedule $S(f_i)$ on a time $t_j$; There are two additional designated vertices $v_s$ and $v_e$ as the starting and ending vertices.
3) an edge in the set of edges E defines a directed link from previous vertex to the following vertex in the sequential order of F.
4) a path($v_s$, $v_e$) defines a route from $v_s$ to $v_e$ connecting all vertex with edges. The times of the vertices along a path compose a set of time series T. Hence a path with eligible edges represents a scheduling of F and the optimal $path_o$ results in the optimal time series $T_o$ for an F.

Furthermore, there are constraints to be complied with for the optimization of the func sequence scheduling:

1) The precedence of funcs in the sequence: As the funcs $f_i$ from F are in consecutive order, the possible $t_j$ chosen to as the implementing time should satisfy the precedence constraint to be greater than the implementing time scheduled for previous func $f_{i-1}$.
2) The duration of implementing a func: Time scheduled for the func $f_i$ should not have overlapping with the time duration of its previous func $f_{i-1}$.
3) Transport cost: There will be time cost for transportation between adjacent funcs when they need to be implemented in different location. Scheduling should take this into consideration.

When defining the duration of a func $f_i$ as a function $d(f_i)$, and the transport cost between funcs as a function $l(f_{i-1}, f_i)$, the scheduling constraints C can be represented as in Equation 6 above.

To satisfy constraints C, each edge in the graph G may be assigned an indicator $e_i$ to indicate its eligibility, which assures the conflict free schedule for the user:

$$\begin{cases} e_i = 1, & \text{if } C \text{ is satisfied} \\ e_i = \frac{1}{\infty}, & \text{otherwise} \end{cases} \quad (8)$$

Especially, edges connecting starting and ending vertices $v_s$ and $v_e$ all have a magnitude of 1.

Further, in the vertex-n-edge-weighted digraph, the vertices V may be weighted by assigning each vertex a weight with the value of $$\log \frac{1}{q(S(f_i))}.$$

For weighting the edges E, each edge may be assigned a weight with the value of $$\log \frac{1}{p(S(f_{i-1}), S(f_i))}.$$

Then each path with eligible edges (conversely, $e_i$=0 means no eligible edge connection) passing corresponding vertices from $v_s$ to $v_e$ represents a possible schedule to be the optimal schedule.

As the objective of optimizing the func sequence scheduling is to maximize the user's preference of scheduling a func sequence F on the optimal time series $T_o$ when subject to constraint C, which can be represent as finding the $T_o$ that maximizes the joint probability P:

$$T_o = \underset{T}{\mathrm{argmax}} \{P(F, T)\} \quad (9)$$

$$= \underset{T}{\mathrm{argmax}} \left\{ \prod_{i=1}^{n} q(S(f_i)) \cdot p(S(f_{i-1}), S(f_i)) \cdot e_i \right\}$$

$$\text{s.t.} \begin{cases} e_i = 1, & \text{if } C \text{ is satisfied} \\ e_i = \frac{1}{\infty}, & \text{else} \end{cases}$$

With the weights $$\log\frac{1}{q(S(f_i))} \text{ and } \log\frac{1}{p(S(f_{i-1}), S(f_i))}$$

that assigned to the vertices and edges in the DAG model, the optimization objective described in Equation 9 for the graph G can be further converted to finding the optimal $\text{path}_o$ which minimize the sum of its all vertices and edges as in Equation 10:

$$Path_o = \underset{Path}{\operatorname{argmax}} \left\{ \sum_{i=1}^n \left( \log\frac{1}{q(S(f_i))} + \log\frac{1}{p(S(f_{i-1}), S(f_i))} + \log\frac{1}{e_i} \right) \right\} \quad (10)$$

$$\text{s.t.} \begin{cases} e_i = 1, & \text{if } C \text{ is satisfied} \\ e_i = \frac{1}{\infty}, & \text{else} \end{cases}$$

With the converted objective, a modified Dijkstra's algorithm may be applied to fit in the DAG with forward pass algorithm in low cost of computational complexity, where at each stage in the algorithm some vertices have permanent labels and others temporary labels.

For example, the forward pass algorithm may be performed as followings:

Step 1: Have all vertices in the topological ordering, and assign a permanent label vertex value of $M_s=0$ to the starting vertex $v_s$, and temporary label $R_{ij}=\infty$ to all the remaining vertices.

Step 2: Every vertex $v_{ij}$ linked by eligible directed edges from previous permanent labeled vertices $v_{i'j'}$ on a possible path that is not yet permanently labeled gets a new temporary label whose value is given by:

$$R_{ij} = \operatorname{sum}\left( M_{i'j'}, \log\frac{1}{q(S(f_i))}, \log\frac{1}{p(S(f_{i-1}), S(f_i))}, \log\frac{1}{e_i} \right) \quad (11)$$

where $R_{ij}$ is the accumulated value on the previous permanently labeled vertex along a Path, weights of vertex and edge, and the logarithm of the reciprocal of $e_i$.

Step 3: The least value $R_{ij}$ among all the temporary labels of a vertex on different path is assigned as permanent label with value $M_{ij}$ on the corresponding vertex.

$$M_{ij} = \min\{R_{ij}\} \quad (12)$$

Step 3 and Step 4 may be repeated until the ending vertex $v_e$ gets a permanent label. The permanent labeled vertex of $M_e$ on the ending vertex with the minimal value indicates the optimal path.

Thus, by tracing back from the ending vertex $v_e$ with the minimal value, the optimal path $\text{path}_o$ can be obtained. The time for the vertices along the $\text{path}_o$ compose the optimal time series $T_o$ as the final optimized func sequence scheduling time results.

Further, referring to FIG. 4, after the optimized or desired func sequence scheduling is determined, the func sequence and the desired func sequence scheduling may be presented to or recommended to the user (416). The user may select the func sequence with the func scheduling, the system may automatically execute the func sequence, including direct transition from one func to another func based on the determined func sequence scheduling. Or if the user selects a particular func or funcs, the system may bring the func or funcs up. The selection from the user, including the sequence, funcs, and scheduling used by the user may be logged or stored in the user database 312 for subsequent func sequence scheduling determination.

For example, based on the information and results deriving the optimal scheduling for a recommended func sequence, and based on user selections, the system may be able to recommend specifics of the func sequence scheduling, such as when should the first func start, when should the next func be, whether there is enough time to transport form the location of the previous func to the next func, whether there is another event already scheduled on agenda that occupy the time of any func in the func sequence, whether the user should start next func right after finishing previous func or would it be a better choice to start the next func on another time such that it might be a more favorable time for completing all func sequence, and what would be the overall best way to schedule a func sequence that carries out the user's need, etc.

Thus, by using the disclosed func sequence scheduling methods and systems, the personalized func sequence scheduling problem can be formulated as a novel formulation and a framework can be developed to schedule a func sequence that fulfill user's intention. The user-preferred, conflict-free and overall optimized schedule can be automatically recommended to an end user by such framework. The personal preference learning model and algorithm in the framework is capable of learning and predicting the user's implicit preferences of implementing a func on any time through personal history data together with other users' data. Tensor factorization and collaborative filter are applied to achieve such results. The global optimal schedule of a func sequence is able to be automatically explored by adaption and combination of unigram HMMs model, critical path analysis and modified Dijkstra's algorithm from graph theory by considering func sequence dependency and satisfying all constraints. The final schedule provided by the framework for a new func sequence to fulfill a user's need can be the best schedule added into the user's existing schedule without any confliction.

Other steps may be referred to above descriptions with respect to the system for scalable user intent mining. Other applications, advantages, alternations, modifications, or equivalents to the disclosed embodiments are obvious to those skilled in the art.

What is claimed is:

1. A method for recommending a desired func sequence schedule by a computing device to a user, comprising:
   obtaining, by a processor of the computing device, at least one user intention inputted by the user;
   creating, by the processor, a func sequence including a plurality of funcs for fulfilling the user intention, each func being an access point to a software program installed on the computing device or to a software program accessible by the computing device via a network;
   determining, by the processor, user preference on scheduling of the plurality of funcs in the func sequence, including:
   accessing, by the processor, a user database containing history records related to the user and from other users with respect to the plurality of funcs implemented on certain times under certain contextual conditions; and applying, by the processor, a Collaborative filtering (CF) model on history records from the user and from other users to predict the user preference based on a three-dimensional tensor depending on three variables including func, time, and user;

determining, by the processor, a dependency relationship among the plurality of funcs in the func sequence;

determining, by the processor, scheduling constraints to the scheduling of the plurality of funcs in the func sequence;

based on the user preference, the dependency relationship, and the scheduling constraints, performing an optimization process, by the processor, to determine a desired schedule, including determining an optimal time result $T_o$ that maximizes the user preference of implementing plurality of funcs in the func sequence while subjecting to scheduling constraints, wherein the optimal time result $T_o$ is calculated as $$T_o = \underset{T}{\mathrm{argmax}}\left\{\prod_{i=1}^{n} q(S(f_i)) \cdot p(S(f_{i-1}), S(f_i)) \cdot e_i\right\}$$

$$\mathrm{s.t.} \begin{cases} e_i = 1, & \text{if } C \text{ is satisfied} \\ e_i = \frac{1}{\infty}, & \text{else} \end{cases},$$

provided that n is a number of the plurality of funcs; i is an integer representing a func number; $F=\{f_1, f_2, \ldots, f_n\}$ denotes the func sequence with a plurality of funcs $f_i$, each have a schedule $S(f_i)=(f_i, t_j)$; $q(S(f_i))$ denotes the user preference on a schedule of a func $f_i$; $p(S(f_{i-1}), S(f_i))$ denotes the dependency relationship; and $e_i$ denotes whether a schedule $S(f_i)$ satisfies scheduling constraints C; and recommending, by the computing device, the func sequence with the desired schedule to the user.

2. The method according to claim 1, wherein creating the func sequence including a plurality of funcs for fulfilling the user intention includes:

separating, by the processor, the user intention into a plurality of tasks without a particular order; and mapping, by the processor, the plurality of tasks into the plurality of funcs.

3. The method according to claim 1, wherein determining a dependency relationship among the plurality of funcs in the func sequence further includes:

determining, by the processor, a dependency of a current func upon one or more previous func as a conditional probability of a schedule of the current func with a schedule of the one or more previous funcs, the conditional probability being obtained from a frequency value recorded in the user database.

4. The method according to claim 3, wherein determining scheduling constraints to the scheduling of the plurality of funcs in the func sequence further includes:

determining, by the processor, the scheduling constraint for each individual func based on a duration of the individual func and a transportation time to reach a location where the func is to take place from a location of a previous func of the individual func.

5. The method according to claim 1, wherein:

the optimal time result $T_o$ is determined by determining a path in a vertex-n-edge-weighted directed acyclic digraph (DAG) network G=(V,E) built by adapting a critical path analysis model, wherein V denotes a set of vertices, each vertex in the set of vertices V defining a schedule $S(f_i)$ on a time $t_j$, and E denotes a set of edges, each edge in the set of edges E defining a directed link from a previous vertex to a following vertex in a sequential order of F.

6. The method according to claim 5, wherein:

provided that vertices $v_s$, and $v_e$ represent the starting and ending vertices, respectively, and path($v_s$, $v_e$) represents a route from $v_s$ to $v_e$ connecting all vertex with edges, the path is determined as a path with eligible edges in the DAG network G.

7. A system for recommending a desired func sequence schedule to a user, comprising:

a memory storing computer-executable instructions; and a processor, when executing the computer-executable instructions, configured to:

obtain at least one user intention inputted by the user;

create a func sequence including a plurality of funcs for fulfilling the user intention, each func being an access point to a software program installed on the computing device or a software program accessible to the computing device via a network;

determine user preference on scheduling of the plurality of funcs in the func sequence, including:

accessing a user database containing history records related to the user and from other users with respect to the plurality of funcs implemented on certain times under certain contextual conditions; and applying a Collaborative filtering (CF) model on history records from the user and from other users to predict the user preference based on a three-dimensional tensor depending on three variables including func, time, and user;

determine a dependency relationship among the plurality of funcs in the func sequence, determining scheduling constraints to the scheduling of the plurality of funcs in the func sequence and, based on the user preference, the dependency relationship, and the scheduling constraints, performing an optimization process to determine a desired schedule, including determining an optimal time result $T_o$ that maximizes the user preference of implementing plurality of funcs in the func sequence while subjecting to scheduling constraints, wherein the optimal time result $T_o$ is calculated as $$T_o = \underset{T}{\mathrm{argmax}}\left\{\prod_{i=1}^{n} q(S(f_i)) \cdot p(S(f_{i-1}), S(f_i)) \cdot e_i\right\}$$

$$\mathrm{s.t.} \begin{cases} e_i = 1, & \text{if } C \text{ is satisfied} \\ e_i = \frac{1}{\infty}, & \text{else} \end{cases},$$

provided that n is a number of the plurality of funcs; i is an integer representing a func number; $F=\{f_1, f_2, \ldots, f_n\}$ denotes the func sequence with a plurality of funcs $f_i$, each have a schedule $S(f_i)=(f_i, t_j)$; $q(S(f_i))$ denotes the user preference on a schedule of a func $f_i$; $p(S(f_{i-1}), S(f_i))$ denotes the dependency relationship; and $e_i$ denotes whether a schedule $S(f_i)$ satisfies scheduling constraints C; and recommend the func sequence with the desired schedule to the user.

8. The system according to claim 7, wherein the processor is further configured to:

separate the user intention into a plurality of tasks without a particular order; and map the plurality of tasks into the plurality of funcs.

9. The system according to claim 7, wherein the processor is further configured to:

determine a dependency of a current func upon one or more previous func as a conditional probability of a schedule of the current func with a schedule of the one or more previous funcs, the conditional probability being obtained from a frequency value recorded in the user database.

10. The system according to claim 9, wherein the processor is further configured to:

determine the scheduling constraint for each individual func based on a duration of the individual func and a transportation time to reach a location where the func is to take place from a location of a previous func of the individual func.

11. The system according to claim 7, wherein:

the optimal time result $T_o$ is determined by determining a path in a vertex-n-edge-weighted directed acyclic digraph (DAG) network $G=(V,E)$ built by adapting a critical path analysis model, wherein V denotes a set of vertices, each vertex in the set of vertices V defining a schedule $S(f_i)$ on a time $t_j$, and E denotes a set of edges, each edge in the set of edges E defining a directed link from a previous vertex to a following vertex in a sequential order of F.

12. The system according to claim 11, wherein:

provided that vertices $v_s$ and $v_e$ represent the starting and ending vertices, respectively, and path($v_s$, $v_e$) represents a route from $v_s$ to $v_e$ connecting all vertex with edges, the path is determined as a path with eligible edges in the DAG network G.

* * * * *